United States Patent
Roodenko Fuchs

(10) Patent No.: US 11,874,222 B1
(45) Date of Patent: Jan. 16, 2024

(54) SYSTEM AND METHOD USING IR RADIATION AND FLUID CHANNEL TO DETECT CONTAMINANTS AND SALTS IN FLUIDS

(71) Applicant: Max-IR Labs, Incorporated, Dallas, TX (US)

(72) Inventor: Ecatherina Roodenko Fuchs, Plano, TX (US)

(73) Assignee: Max-IR Labs, Incorporated, Dallas, TX (US)

( * ) Notice: Subject to any disclaimer, the term of this patent is extended or adjusted under 35 U.S.C. 154(b) by 26 days.

(21) Appl. No.: 17/678,721

(22) Filed: Feb. 23, 2022

Related U.S. Application Data

(60) Provisional application No. 63/153,823, filed on Feb. 25, 2021.

(51) Int. Cl.
*G01N 21/35* (2014.01)

(52) U.S. Cl.
CPC ....... *G01N 21/35* (2013.01); *G01N 2201/062* (2013.01); *G01N 2201/06113* (2013.01)

(58) Field of Classification Search
CPC ......... G01N 21/35; G01N 2201/06113; G01N 2201/062
See application file for complete search history.

(56) References Cited

U.S. PATENT DOCUMENTS

| | | | |
|---|---|---|---|
| 10,974,241 B2 * | 4/2021 | Haeberle | G01N 27/42 |
| 2005/0269499 A1 * | 12/2005 | Jones | G01N 21/3504 250/269.1 |
| 2009/0079976 A1 * | 3/2009 | Cunningham | B01L 3/5027 356/246 |
| 2012/0287418 A1 * | 11/2012 | Scherer | G01N 21/39 356/51 |

FOREIGN PATENT DOCUMENTS

WO    WO-2016028401 A1 *  2/2016  ............ G01J 3/0205

* cited by examiner

*Primary Examiner* — David P Porta
*Assistant Examiner* — Fani Polyzos Boosalis

(57) ABSTRACT

An infrared (IR) radiation sensor for detection of an analyte in a fluid. The IR sensor comprises: i) a housing; ii) a reservoir disposed in the housing and configured to contain the fluid; iii) a fluid channel in communication with the reservoir; and iv) a preconcentration material associated with the fluid channel. The preconcentration material enhances IR bands in an IR spectra. The IR sensor also includes a photonic integrated circuit disposed in the housing. The photonic integrated circuit includes an IR source configured to transmit IR light toward the fluid channel and the preconcentration material. A spectral characteristic of the IR light is changed by the analyte in the fluid in the fluid channel that is trapped in the preconcentration material. The photonic IC also includes an IR detector configured to receive IR light transmitted through or reflected off the preconcentration material and detect the spectral characteristic.

18 Claims, 10 Drawing Sheets

SYSTEM AND METHOD USING IR RADIATION AND FLUID CHANNEL TO DETECT CONTAMINANTS AND SALTS IN FLUIDS

CROSS-REFERENCE TO RELATED APPLICATION(S) AND CLAIM OF PRIORITY

The present application is related to U.S. Provisional Patent No. 63/153,823, filed 25 Feb. 2021, entitled "Infrared Platform For Detection Of Contaminants And Salts In Fluids". Provisional Patent No. 63/153,823 is assigned to the assignee of the present application and is hereby incorporated by reference into the present application as if fully set forth herein. The present application hereby claims priority under 35 U.S.C. § 119(e) to U.S. Provisional Patent No. 63/153,823.

TECHNICAL FIELD

The present application relates generally to water sensors and, more specifically, to a water sensor based on infrared detection for identifying biological and chemical contaminants in water.

BACKGROUND

Conventional techniques for assessing water quality involve "grab-sampling", where samples are collected and sent to a centralized laboratory for tests. The results are generally available in 4 to 6 weeks. If the surface or ground water supplies are the only sources in emergency situations (e.g., after a natural disaster) or during outdoor activities (e.g., hiking) or if tap water is suspected of being contaminated, such a delay is unacceptable. It put any person at risk for acute or chronic health effects if that person chooses to drink the water without any knowledge of the risks.

While devices based on infrared vibrational analysis have been developed to detect selected chemicals in gas phase, there currently are no equivalent hand-held devices for detecting most water contaminants. Vibrational analysis tools (e.g., Raman and Infrared (IR) spectroscopies) are receiving attention as possible portable detectors of water contaminants. In comparison to IR, Raman scattering processes generally have orders-of-magnitude lower cross-sections, thereby limiting sensitivity. Surface-Enhanced Raman Spectroscopy (SERS) consisting of thin metallic films or metallic particles on which the contaminants are anchored has become a standard for Raman signal enhancement. However, this technology requires specifically engineered SERS media, which have multiple disadvantages such as decrease in signal due to surface degradation, limited selectivity of the substrates to a given analyte, and limited substrate reusability.

There is a need for a reliable, light-weight hand-held water sensor capable of identifying biological and chemical contaminants in water, including but not limited to ground or surface water, wastewater from agricultural, industrial, or municipal use, and tap water in households.

SUMMARY

To address the above-discussed deficiencies of the prior art, it is a primary object to provide an infrared (IR) radiation sensor for detection of an analyte in a fluid. The IR sensor comprises: i) a housing; ii) a reservoir disposed in the housing and configured to contain the fluid; iii) a fluid channel in communication with the reservoir; iv) a preconcentration material associated with the fluid channel, wherein the preconcentration material enhances IR bands in an IR spectra; and v) a photonic integrated circuit disposed in the housing. The photonic IC comprises an IR source configured to transmit IR light toward the fluid channel and the preconcentration material. A spectral characteristic of the IR light is changed by the analyte in the fluid in the fluid channel that is trapped in the preconcentration material. The photonic IC also includes an IR detector configured to receive IR light transmitted through or reflected off the preconcentration material and detect the spectral characteristic.

It is another object to provide an infrared (IR) sensor for detection of an analyte in a fluid. The IR sensor comprises: i) a housing; ii) a reservoir disposed in the housing and configured to contain the fluid; iii) a fluid channel in communication with the reservoir; and iv) a preconcentration material associated with the fluid channel, wherein the preconcentration material enhances IR bands in an IR spectra. The IR sensor further includes an IR source configured to transmit IR light toward the fluid channel and the preconcentration material. A spectral characteristic of the IR light is changed by the analyte in the fluid in the fluid channel that is trapped in the preconcentration material, The sensor also includes an IR detector configured to receive R light transmitted through or reflected off the preconcentration material and detect the spectral characteristic.

It is still another object to provide a method of a method of detecting the presence of an analyte in a fluid. The method, comprises: i) filling a reservoir with the fluid; ii) transferring the fluid from the reservoir to a fluid channel in communication with the reservoir, wherein a preconcentration material associated with the fluid channel enhances IR bands in an IR spectra, The method also includes transmitting IR light toward the fluid channel and the preconcentration material, wherein a spectral characteristic of the IR light is changed by the analyte in the fluid in the fluid channel that is trapped in the preconcentration material. The method further includes receiving IR light transmitted through or reflected off the preconcentration material and detecting the spectral characteristic.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged water sensor.

The present disclosure describes a water sensor that can be hand-held or stationary that identifies biological and chemical contaminants in water, including ground water, surface water, agricultural and industrial wastewater, and tap water in homes and offices. Because water strongly absorbs infrared (IR) radiation, an attenuated total reflection (ATR) technique is usually utilized for sensing of water contaminants. For the purposes of this disclosure and the claims herein, infrared radiation is defined to include light having a wavelength from 1 micrometer to 15 micrometers. In ATR, IR radiation passes through a waveguide rather than water. The sensing is performed by means of the evanescent field produced by the IR radiation.

Figure 1A:
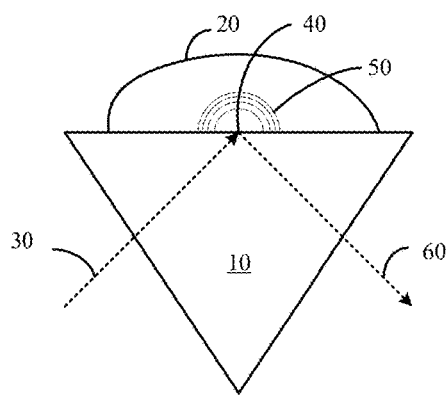
FIG. 1A is a single-bounce waveguide illustrating the creation of an evanescent field at a surface thereof.

FIG. 1A is a view of a single-bounce waveguide 10 illustrating the creation of an evanescent field at a surface thereof. The waveguide 10 portion adjoins a fluid 20. Light propagates through the waveguide 10 portion, illustrated by an incoming arrow 30. Total internal reflection of the light occurs off a point 40 on the surface (unreferenced) of the waveguide 10 portion, creating an evanescent field 50 in a region of the fluid 20. The light then exits the waveguide 10 portion, illustrated by an outgoing arrow 60. The principle underlying the operation of the microfluidic device and method embodiments disclosed herein is that an analyte in the evanescent field 50 will interact with evanescent field 50 and thereby change the spectral characteristics of the light propagating in the waveguide 10 portion. This is known as attenuated total reflectance (ATR). In general, the change measured in the exiting beam 60 takes the form of wavenumber-dependent absorption. The spectral characteristics may then be measured, providing information about the identity and concentration by the molecular absorption bands of the analyte. In various specific embodiments, the analyte effects an absorbance at particular wavenumbers of the light, and the absorbance spectrum may be analyzed to learn the identity and concentration or the molecular absorption bands of the analyte.

Figure 1B:
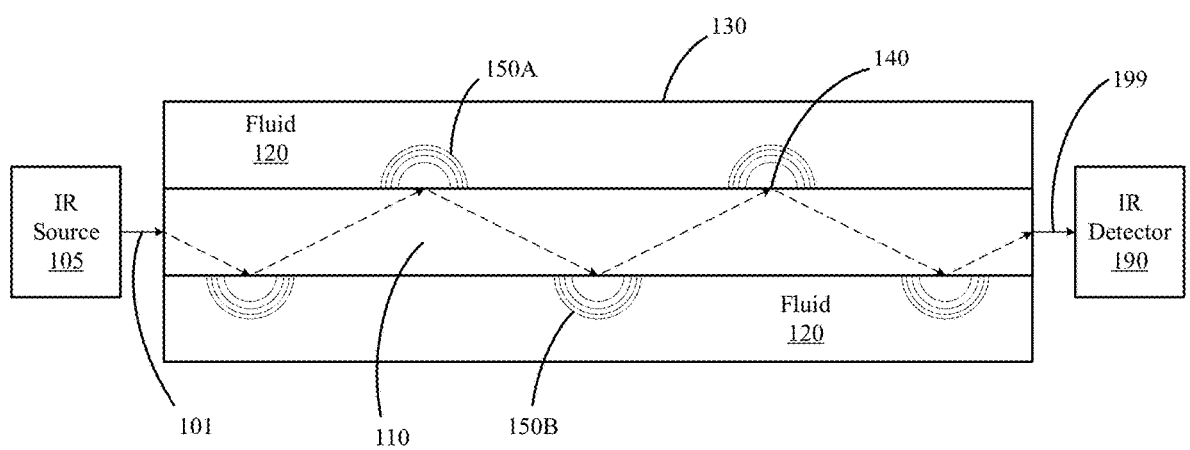
FIG. 1B is a sectional view of a waveguide illustrating the creation of multiple evanescent fields at a surface thereof.

FIG. 1B is a sectional view of a waveguide 110 illustrating the creation of multiple evanescent fields at a surface thereof. FIG. 1B illustrates one embodiment of a device employing the principle of FIG. 1A. FIG. 1B illustrates an elongated waveguide 110 and adjoining a fluid 120 along its length. The fluid 120 and the waveguide 110 are disposed within a reservoir 130. Light (indicated by arrow 101) enters the waveguide 110, propagates along the waveguide 110, undergoes total internal reflection off its surface (unreferenced) many times (as indicated by the dotted arrows), thereby creating a series of evanescent fields 150 (including evanescent fields 150A and 150B) along the length of the waveguide 110 before exiting, as the arrow 199 indicates.

FIG. 1B also illustrates an infrared (IR) light source 105 situated to provide light into the waveguide 110 and an infrared (IR) light detector 190 situated to receive the light from the waveguide 110 and produce an electric signal as a function thereof. According to the principle set forth above, the light exiting the waveguide 110 and received by the light detector 190 contains spectral characteristics that are changed by one or more analytes in the fluid 120 that are in, or pass through, the evanescent fields 150. The signals produced by the light detector 190 may then be analyzed to identify and determine the concentration or molecular absorption bands of the analyte in the fluid 120.

Figure 2:
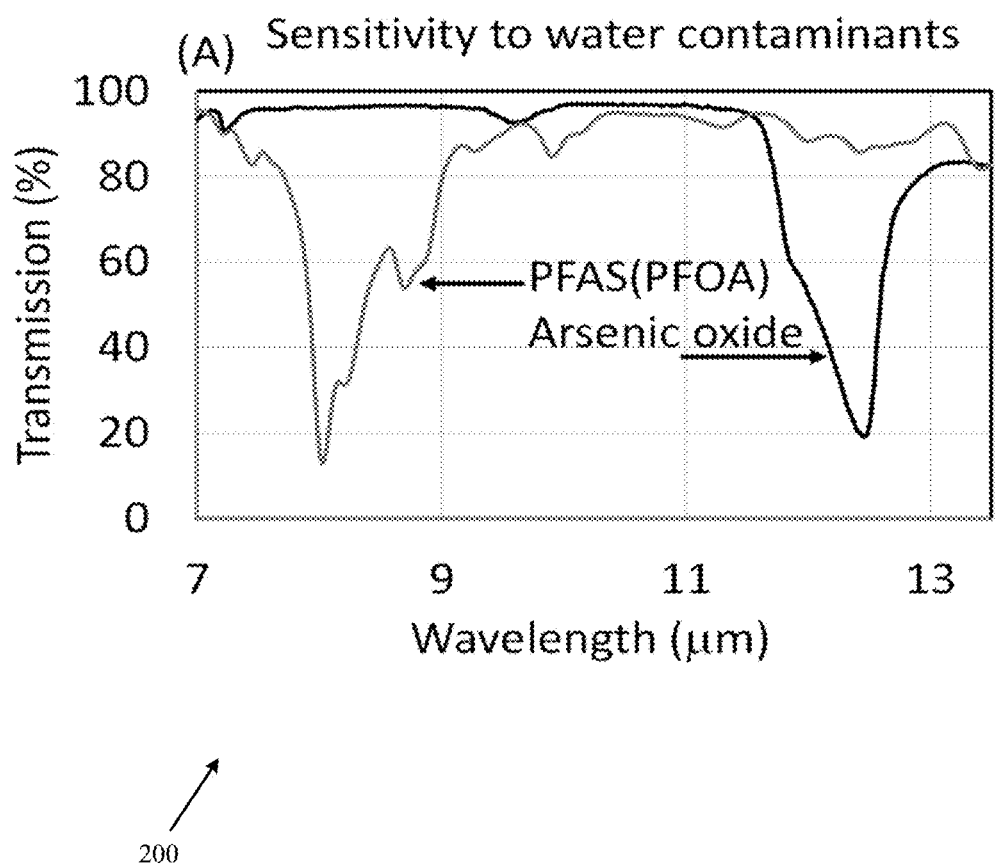
FIG. 2 illustrates changes in transmission of IR light through a waveguide upon addition of PFOA and arsenic oxide to water according to an embodiment of the disclosure.
Figure 3:
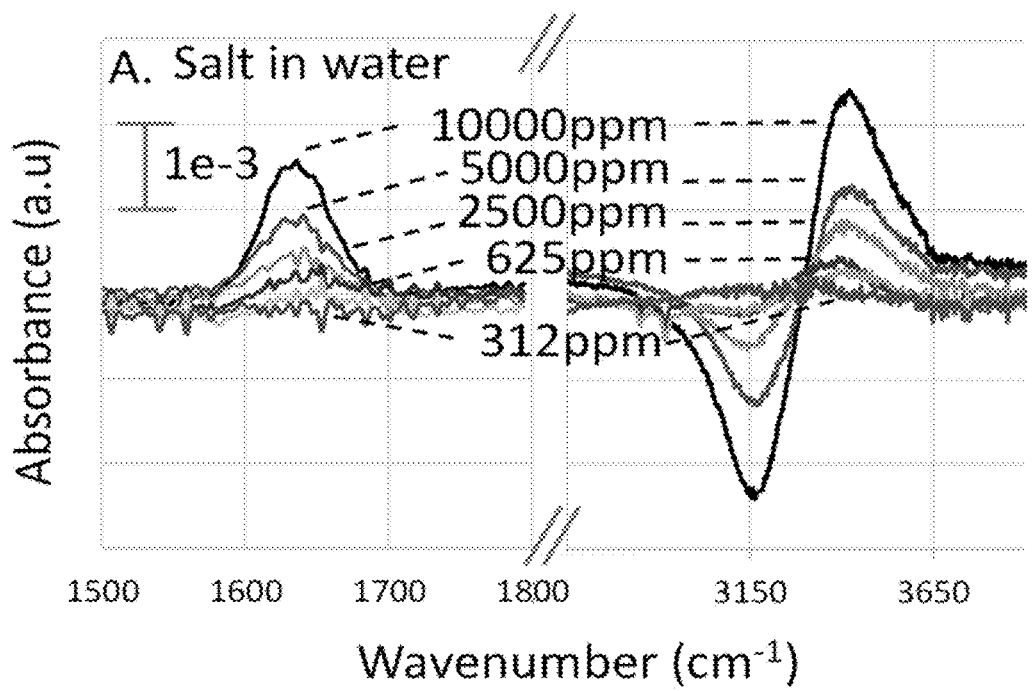
FIG. 3 illustrates IR spectral changes upon addition of salt (NaCl) to water according to an embodiment of the disclosure.
Figure 4:
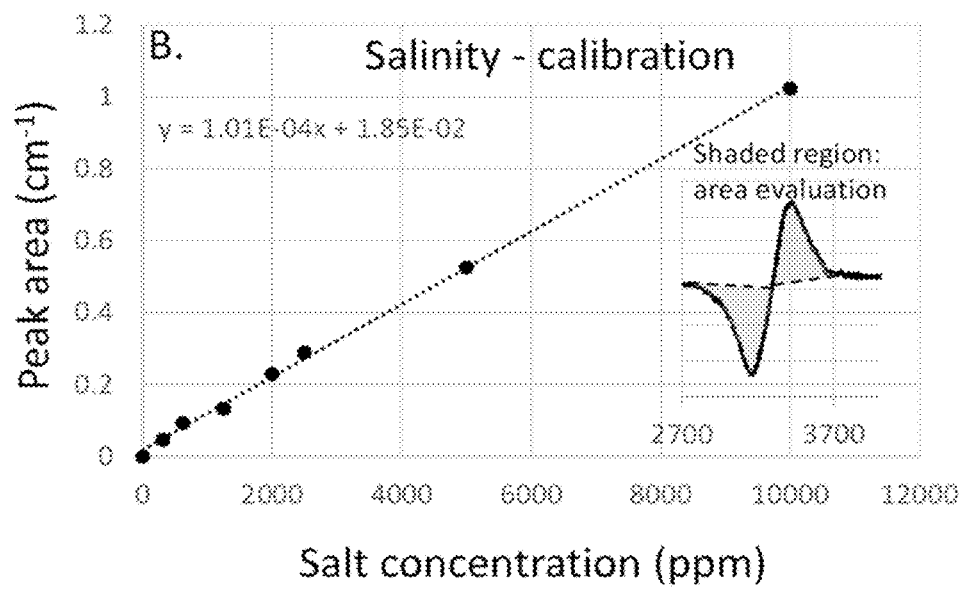
FIG. 4 illustrates a calibration chart based on the absorption band area according to an embodiment of the disclosure.

Attenuated total reflectance is not limited to infrared radiation and may be used with visible light as well, but with a lower penetration depth of the evanescent field. Infrared radiation is a very powerful tool for detection of multiple chemicals in water. FIGS. 2-4 show IR transmission data from a class of Per- and polyfluoroalkyl substances (PFAS), including perfluorooctanoic acid (PFOA).

FIG. 2 illustrates IR spectra 200 for example solutions of PFOA and arsenic oxide according to an embodiment. Arsenic comes in two different oxidation states: As(III) and As(V), both of which are detectable by infrared. IR radiation is sensitive to a variety of toxic industrial chemicals (TICs) and materials (TIMs), such as cyanides, nitriles, organophosphates, herbicides, and pesticides. Among the nitrogen compounds, infrared is sensitive to nitrate in a form of ammonia/ammonium (i.e., in form of $NH_3$ and $NH_4^+$), as well as nitrate and nitrite with applications in agriculture, wastewater treatment, and other fields.

Referencing is usually required in infrared detection. In FIGS. 2-4, referencing is performed against water without the contaminants. FIG. 3 illustrates IR spectral changes 300 upon addition of salt (NaCl) to water according to an embodiment of the disclosure. FIG. 4 illustrates a calibration chart 400 based on the absorption band area according to an embodiment of the disclosure.

Infrared (IR) spectroscopy also can provide data on salt concentration due to changes in IR absorption bands that are related to water bending (around 1650 cm$^{-1}$) and stretching (3000-3700 cm$^{-1}$) vibrations upon addition of salt. Addition of salt to water leads to formation of aqua ions similar to [Na(H$_2$O)$_6$]$^+$, which results in changes in the vibrational absorption spectra that can be directly correlated with salt concentration. Water salinity is measured in units of parts-per-thousand (ppt). The ability to follow salt concentration in freshwater (in the range between 0 ppt-0.5 ppt), brackish water (0.5 ppt-30 ppt), and saline water (any concentration above 30 ppt) is particularly attractive for applications of sensors in water quality testing across the entire water industry, namely in desalination plants and drinking and wastewater treatment plants. This may be achieved using an IR spectrometer or a non-dispersive infrared setup. For example, the spectrometer may be based: i) Fourier-transform infrared (FTIR) spectrometers; ii) on spectrometers that utilize tunable IR sources such as lasers or light-emitting diodes; or iii) using non-dispersive infrared methods.

IR spectroscopy has conventionally been confined to labs, in the form of Fourier-Transform Infrared (FTIR) spectrometers. Conventional mid-infrared systems are built based on an assembly of discrete components, such as light sources, detectors, free space optics, moving mirrors, and the like. As a result, such systems are invariably bulky, expensive, and inefficient.

Figure 5:
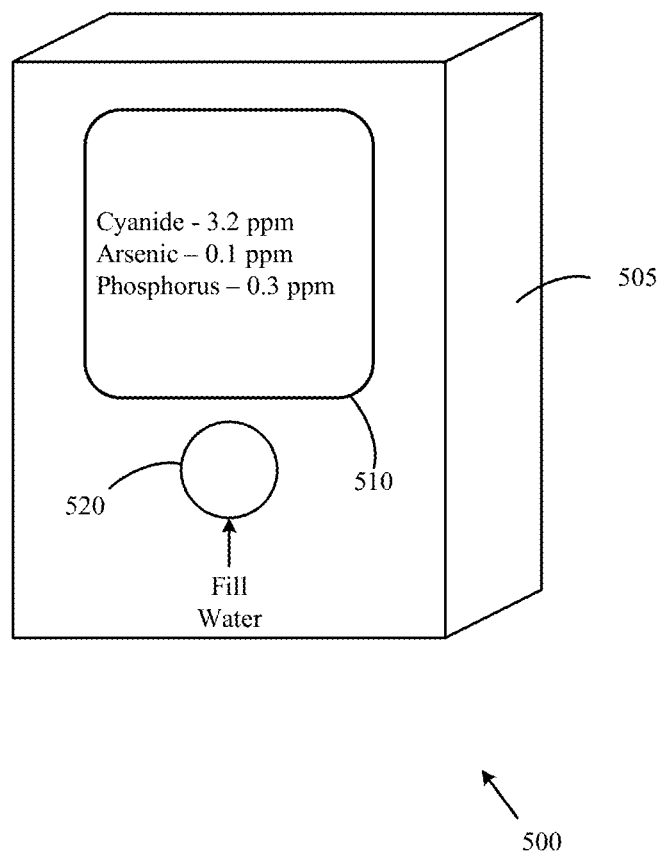
FIG. 5 illustrates an infrared (IR) sensor for detection of chemicals and contaminants in water according to an embodiment of the disclosure.

FIG. 5 illustrates an example of an infrared (IR) sensor 500 for detection of chemicals and contaminants in water according to an embodiment of the disclosure. The IR sensor 500 comprises a housing 505 that contains the other components of the IR sensor 500, a display 510 on an exterior surface of the housing 505, and an opening 520 on the surface. The opening 520 permits a water sample to be introduced into an internal reservoir (not shown) in the IR sensor 500.

The disclosed IR sensor 500 includes an infrared source. The source may be integrated monolithically on a platform with a waveguide (as in FIG. 7) or may be implemented as discrete components (as in FIG. 1B). Monolithic integration can be enabled, for example, in case of solid-state quantum cascade lasers (QCLs) or interband cascade lasers (ICLs). Lasers can be tunable or can emit IR radiation at a specified broad spectral band (such as Fabry-Perot QCLs). Distributed feedback (DFB) QCLs can be used for emission at a narrow spectral band, with a well-defined wavelength. An array of infrared emitters, where each source emits in a specified spectral band, can be utilized for sensing of multiple contaminants. Monolithic integration onto a single semiconductor platform enables IR spectroscopy to be fabricated in inexpensive, on-chip, infrared photonics integrated circuits (IR-PIC) that include an IR source, ATR waveguides, and IR detectors.

IR sensor 500 enables applications that are particularly useful in combat and defense applications and for recreation activities (e.g., sailing, hiking, mountaineering), where the sensor 500 can aid in assessing water quality from indigenous sources or to validate proper operation of the available purification systems. In an example embodiment, the IR sensor 500 includes IR-PIC technology based on mid-IR QCLs and quantum cascade detectors (QCDs) that are epitaxially grown on III-V semiconductor substrates (i.e., InP). Under zero or reverse bias, photons that reach the quantum-cascade device structure induce photocurrent, and the device functions as a detector (QCD). Epitaxial growth of QCL and QCD structures are available from IntelliEpi, IQE, Thorlabs and others. Designs for infrared photonics integrated circuits (IR-PIC) incorporating QCL and QCD on a single platform are presently a subject of intensive academic research. Another possibility is to use integration of infrared light-emitting diodes (LEDs). The function of an LED source can be reversed to serve as a photodiode detector. Another possibility for source/detector integration is interband cascade laser (ICL) and interband cascade detector (ICD). All these source/detector pairs rely on the same epitaxial device structure and can be integrated monolithically on the same platform.

Figure 6:
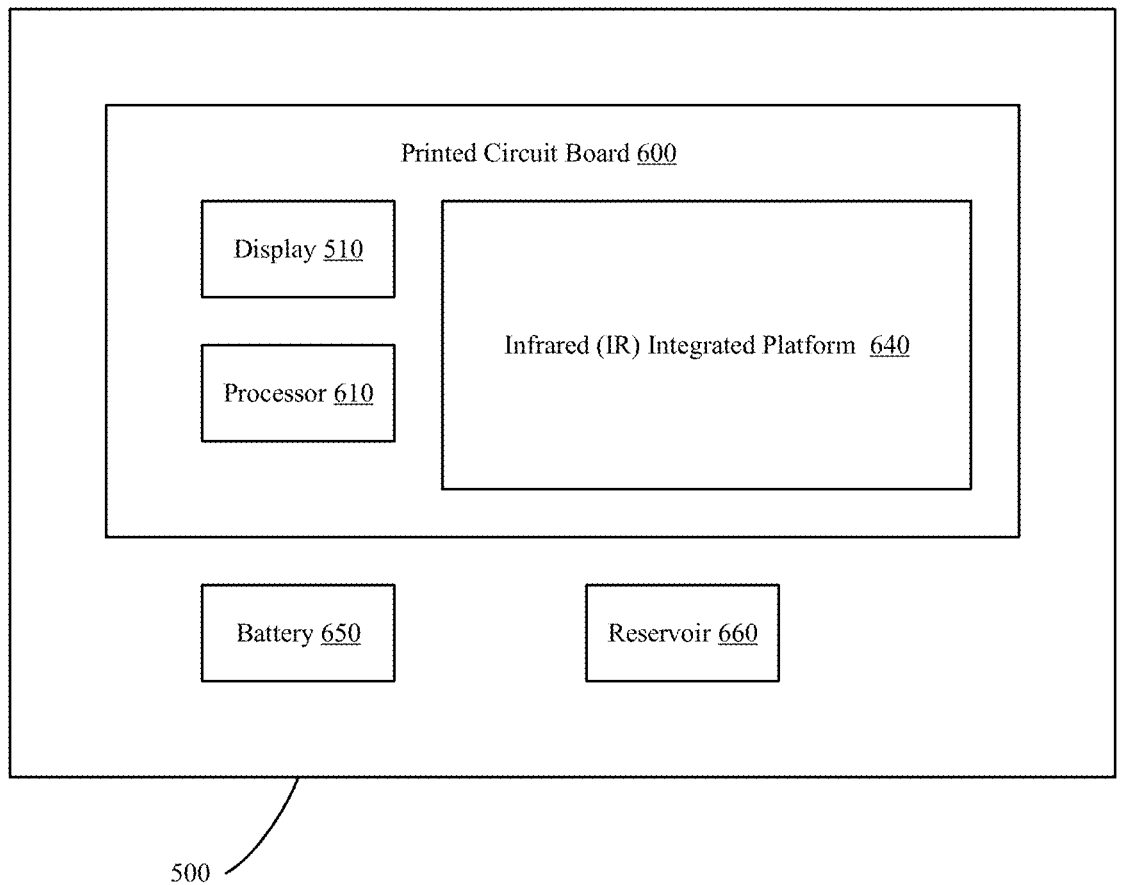
FIG. 6 illustrates an electrical schematic of the handheld infrared (IR) sensor in FIG. 5 according to an embodiment of the disclosure.

FIG. 6 illustrates an internal schematic of the infrared (IR) sensor 500 in FIG. 5 according to an embodiment of the disclosure. IR sensor 500 comprises a printed circuit board (PCB) 600, a battery 650 that provides power to the components on PCB 600, and a reservoir 660 that is in fluid communication with the opening 520. In operation, the reservoir 660 holds the sample fluid being tested and provides the components on IR integrated platform 640 with contact access to the fluid. The display 510 in FIG. 5 is mounted on the PCB 600. A processor 610 and an infrared (IR) integrated platform 640 are also mounted on PCB 600.

The processor 610 executes an operating system program that controls the overall operation of IR sensor 500, calculates test results, and displays the results on display 510. The operating system program executed by processor 610 may be stored internal to processor 610 (i.e., a microcontroller application) or may be stored in an external memory (not shown), such as a flash memory. The processor 610 executes the operating system program to control the components in the IR integrated platform 540, including one or more quantum cascade lasers (QCLs) and one or more quantum cascade detectors (QCDs).

Figure 7:
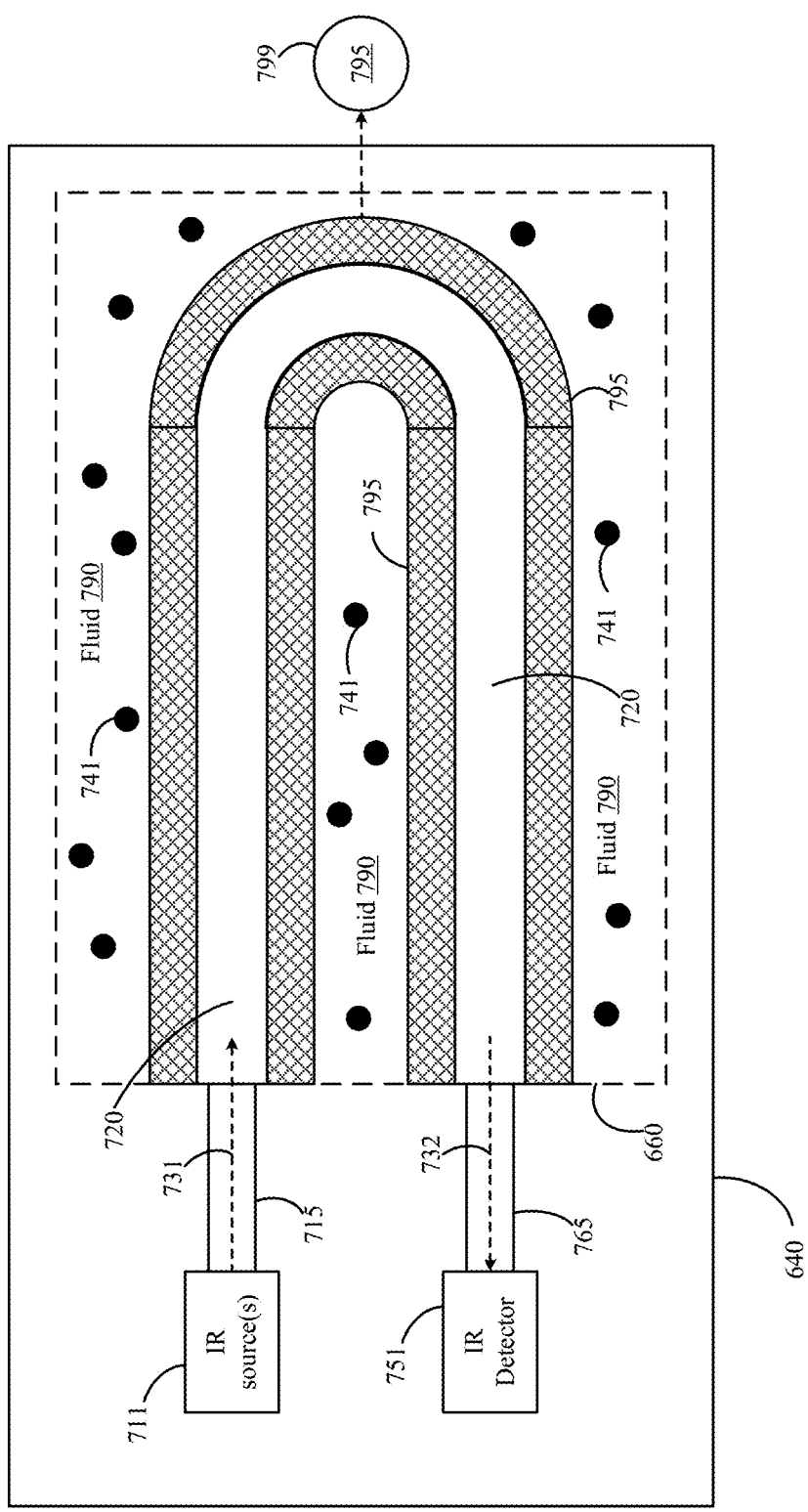
FIG. 7 illustrates an infrared (IR) integrated platform in greater detail according to an embodiment of the disclosure.

FIG. 7 illustrates infrared (IR) integrated platform 640 in greater detail according to an embodiment of the disclosure. The IR integrated platform 640 comprises one or more infrared (IR) source(s) 711, an infrared (IR) coupler 715, an IR detector 751, and an IR coupler 765. IR integrated platform 640 further comprises a waveguide 720 that is in contact with a fluid 790 in reservoir 660 (indicated by dotted line). The waveguide can be U-shaped or straight, depending on application. The space around the waveguide 720 comprises one or more fluid channels that bring the fluid 790 in contact with the outer surface of the waveguide 720. In other embodiments, the waveguide 720 may have multiple U-shaped turns or may be a straight channel in the form of a single strip connected between the IR source(s) 711 and the IR detector 751.

According to the principles of the present disclosure, the IR source(s) 711, the IR coupler 715, the IR detector 751, the IR coupler 765 and the waveguide 720 are all fabricated on the IR integrated platform 640 in the form of a single integrated circuit wafer. In some embodiments, IR integrated platform 640 may further comprise a preconcentration material 795 (shown with a cross-hatched pattern) that covers at least a portion of the outer surface of the waveguide 720 that is in contact with the fluid 790. Preconcentration material 795 (e.g., an ion-exchange resin or metal-oxides such as aluminum oxide) may be added or coated on the waveguide 720 to enhance sensitivity and selectivity, if necessary. In FIG. 7, the fluid 790 (e.g., water) surrounds waveguide 720, while contaminants 741 are shown as black dots in the fluid 790.

Figure 8:
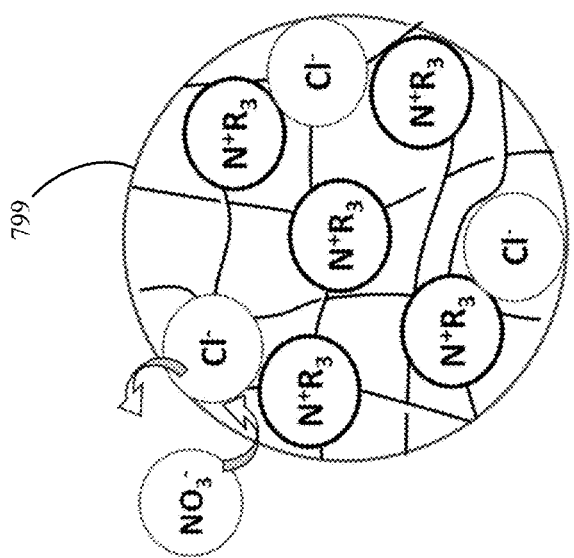
FIG. 8 illustrates an enlarged view of the example for preconcentration material highlighted in the circle in FIG. 7 according to an embodiment of the disclosure.

FIG. 8 is an enlarged view of the preconcentration material 795 highlighted in the circle 799 in FIG. 7 according to an embodiment of the disclosure. FIG. 8 illustrates an example of an anion-exchange preconcentration material 795 for nitrate absorption ($NO_3^-$ groups), based on cross-linked polystyrene with tertiary amine ($N^+R_3$) groups.

In an example embodiment, the IR source(s) 711 may comprise, for example, IR lasers, including quantum cascade lasers (QCLs), and the IR detector 751 may comprise one or more quantum cascade detectors (QCDs). IR coupler 715 receives IR light from IR source(s) 711 and transmits the IR light into the waveguide 720 as indicted by the dotted-line arrow 731. As in FIG. 1B above, the transmitted IR light from IR coupler 715 enters the waveguide 720, propagates along the waveguide 720, reflects off its internal surface (unreferenced) one or more times, thereby creating evanescent fields 150 (as in FIG. 1B) along the length of the waveguide 720 before exiting. The exiting light is received by IR coupler 765 as indicated by the dotted-line arrow 732. The IR coupler 765 then transmits the IR light to the IR detector 751.

Figure 9:
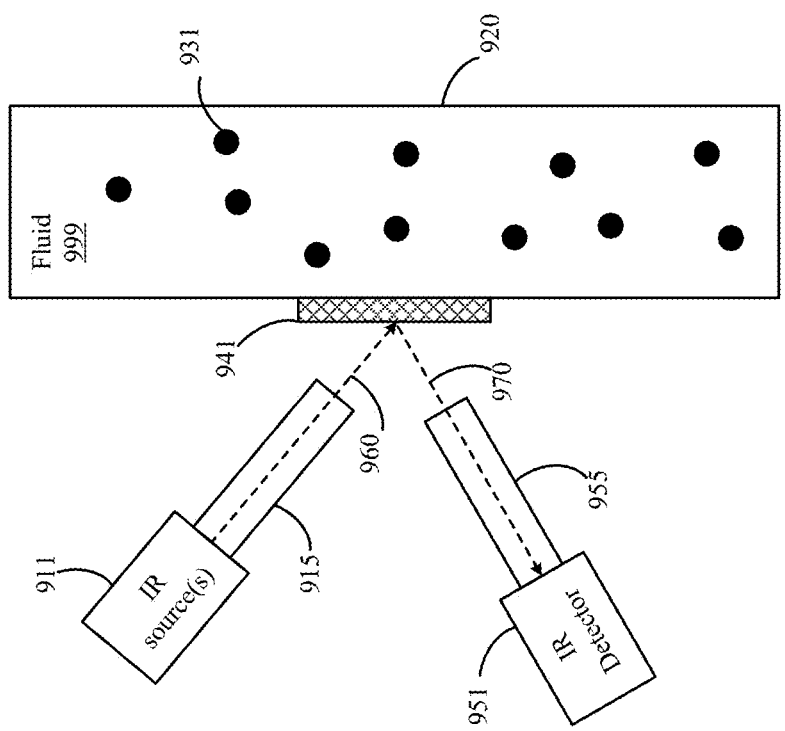
FIG. 9 illustrates an alternate embodiment of the handheld infrared (IR) sensor in which IR light is reflected off an ion exchange preconcentration material on the surface of a fluid channel.

FIG. 9 illustrates an alternate embodiment of the infrared (IR) sensor 500 in FIG. 5 in which light is reflected off an ion exchange preconcentration material 941 on the surface of a fluid channel 920. This may be referred to as reflection mode. The fluid channel 920 holds a fluid 999 that contains analytes 931, that may include biological and/or chemical contaminants 931 (e.g., cyanides, bacterial cells, salt, etc.). In FIG. 9, IR source(s) 911 and IR coupler 915 generate and transmit a beam of infrared (IR) light (indicated by dotted line 960) that reflects off preconcentration material 941. The reflected IR light (indicated by dotted line 970) is received and processed by IR coupler 955 and IR detector 951. As in the case of FIGS. 1A and 1B above, the reflected light from preconcentration material 941 will contain spectral characteristics that are changed by one or more analytes that are absorbed in the preconcentration material 941 from the fluid 999. The preconcentration material 941 may be a freestanding preconcentration material (such as a membrane) or a film coated on an optical window that is transparent in the infrared spectral range, such as ZnSe, Ge, silicon, AMTIR, etc. The coated surface in this case faces the fluid 999 for absorption of contaminants.

Figure 10:
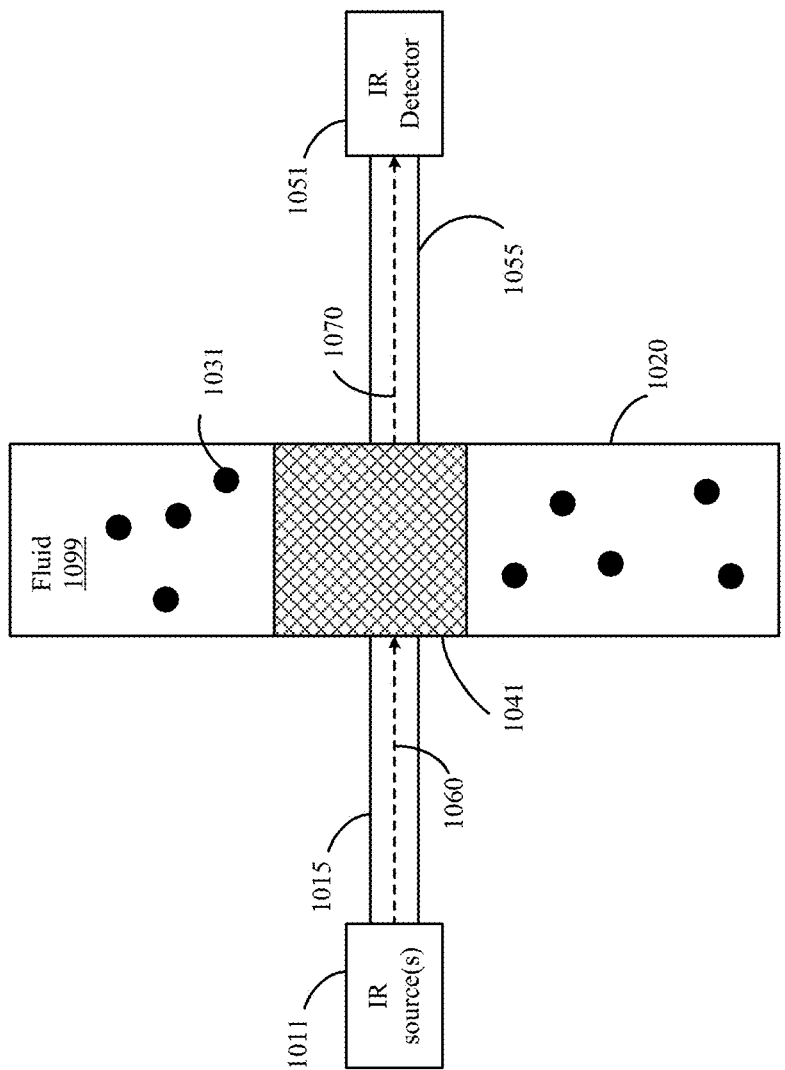
FIG. 10 illustrates an alternate embodiment of the handheld infrared (IR) sensor in which light is transmitted through a fluid channel and through a preconcentration material on the surface of the fluid channel.

FIG. 10 illustrates an alternate embodiment of the handheld infrared (IR) sensor 500 in FIG. 5 in which light is transmitted through a fluid channel 1020 and through a preconcentration material 1041 on the surface of the fluid channel 1020. This may be referred to as transmission mode. The fluid channel 1020 holds a fluid 1099 that contains analytes 1031, that may include biological and/or chemical contaminants 1031 (e.g., salt). In FIG. 10, IR source(s) 1011 and IR coupler 1015 generate and transmit a beam of infrared (IR) light (indicated by dotted line 1060) that is transmitted through the channel 1020 and the preconcentration material 1041 on the surface of the channel 1020. The outgoing IR light (indicated by dotted line 1070) is received and processed by IR coupler 155 and IR detector 1051. As in the case of FIGS. 1A and 1B above, the outgoing light from the preconcentration material 1041 will contain spectral characteristics that are changed by one or more analytes in the fluid 1099 that are trapped in the preconcentration material.

The disclosed sensor may be used to detect toxic organic and inorganic chemicals, such as PFAS, arsenic oxide, nitrogen-based water contaminants such as nitrate, nitrite, and ammonia, and TICs/TIMs, as well as sources and products of biological metabolism (e.g., glucose, lactate, acetate, and the like) in fluids using IR-ATR mechanism.

The disclosed sensor also enables application of infrared spectroscopy (or non-dispersive infrared methodology) to detect salts in fluids based on evaluation of the IR spectral bands due to water interaction with the salts. The disclosed sensor utilizes IR peak intensity or peak area to correlate the salt concentration with the strength of the IR peaks, as in FIGS. 2-4. In the case of NaCl (salt), FIG. 3 shows the changes in the IR spectra due to addition of salt may appear in the spectral ranges between (a) 1600 cm-1700 cm$^{-1}$ and between (b) 2700-3700 cm$^{-1}$. Interaction of salt with other fluids leads to a shift of absorption bands that are analogous to aqua ions similar to $[Na(H_2O)_6]^+$. Interaction of water with other salts will also result in similar IR peaks but at different wavenumbers.

The disclosed sensor detects metal ions in aqueous solution (known as aqua ions) with a chemical formula $[M(H_2O)n]^{z+}$, where z is the electrical charge on the metal ion and n is the solvation number. For example, the solvation number n is 4 for $Li^+$ and $Be^{2+}$. For elements in periods 3 and 4 of the periodic table the solvation number is 6. The most common ions present in water sources are $Na^+$, $K^+$, $Mg^{2+}$ and $Ca^{2+}$. The presence of specific salts (metals) in water or another fluid may be distinguished by the particular infrared frequency where the IR peak appears due to the addition of the salt.

The disclosed sensor detects and monitors changes in water absorption bands due to water coordination in higher oxidation states, where the simple aqua ions dissociate losing hydrogen ions to yield complexes that contain both water molecules and hydroxide or oxide ions, such as the vanadium (IV) species $[VO(H_2O)_5]^{2+}$.

The disclosed sensor monitors salts in water and determines the presence or absence of salts and their concentrations based on the calibration curves (e.g., FIG. 4). The correlation between the concentration of salt and the IR spectral data can be based on correlation of the IR band area, or the intensity, or other related features of the spectra.

For IR-based salt detection, the disclosed sensor provides IR detection (Fourier-transform or based on Quantum-cascade lasers, etc.) and a methodology (in transmission through drops of water or using attenuated total reflection, etc.) that results in clear IR spectral bands due to the presence of salt in fluids.

Advantageously, the disclosed sensor implements monolithically integrated infrared platform, including QCLs, QCDs, light couplers and waveguides, for monitoring of contaminants, bacterial metabolites, and salts in fluids. A platform for IR fluid analysis may be fully or partially integrated in the disclosed sensor. In one example of partial integration, the platform may include QCL with light couplers and integrated waveguides and the detector may be any external infrared detector (such as MCT or DTGS) that are not integrated on a platform. Alternatively, the QCL and the QCD may be integrated on a platform, while the waveguide may be external, for example, based on silver-halide or Ge material, or the like.

In some embodiments of the disclosed sensor, the waveguides are fully or partially submersed in an analyzed fluid. In some embodiments of the disclosed sensor, detection of contaminants and salts in fluids on an integrated/partially integrated platform may be accomplishes without integration of ATR waveguides. In this configuration, the infrared light passes through the fluid directly (i.e., transmission mode through fluid in FIG. 10) without involvement of the ATR waveguides). If the optical path through the fluid "thickness" is low enough, IR radiation may pass though it without being fully absorbed in the fluid, carrying spectral features that may be used to differentiate between different contaminants and salts.

In some embodiments of the disclosed sensor, the preconcentration materials may be coated on the waveguides or may be in touch with the waveguides (the waveguides can be integrated on the platform or can be external to the platform) for preferential or selective absorption of specific contaminants. These materials also allow preconcentration for enhancement of the IR bands in the IR spectra in the attenuated total reflection mode (where the IR light passes through the waveguides as in FIG. 1A, FIG. 1B, and FIG. 7).

The preconcentration material may also be free-standing (rather than coated) in a form of a free-standing film or membrane, as in FIG. 9 and FIG. 10. In such a scenario, the IR radiation passes through ion-selective material (in transmission mode as in FIG. 10 or in reflection mode as in FIG. 9). In contact with the contaminated fluid, the ion-selective material will preferentially retain particular contaminants from the fluid. The contaminants and salts of interest, retained by ion-selective material from the fluid in contact, will give rise to the specific IR absorption bands or specific IR features, and the presence or absence of the contaminants can be thus inferred from the IR spectra.

In some embodiments of the disclosed sensor, the ion-selective materials can be coated in the form of a film or membrane on a support surface made of IR-transparent material (such as InP, Ge, silver halides, KRS-5, etc.). The IR radiation reflects from the support surface with a coated preconcentration material that faces the fluid, similar to FIG. 9. As in the case of free-standing materials, the detection of the features on the IR spectra correlates to the concentration or the presence or absence of the contaminants in the fluid.

In some embodiments of the disclosed sensor, the preconcentration materials may be coated on reflective surfaces, such as gold-coated surfaces. In this case, the reflective surfaces are used as a support for the preconcentration films. Analyzed fluid can wet the preconcentration material coated on a reflective surface. In this case, the reflection will occur off the wetted preconcentration film, with a reflective surface beneath it. The presence or absence of the contaminants and their concentrations in fluid that is in contact with the preconcentration film can be then revealed from the IR radiation reflected from the preconcentration film or membrane. The IR radiation will carry IR spectroscopic features due to the particular contaminants trapped or absorbed in the preconcentration materials.

In some embodiments of the disclosed sensor, regeneration of the preconcentration materials can be performed within the sensor for continuous operation by flashing with the standard regeneration chemicals. For example, regeneration of nitrate-absorbing ion-selective materials can be performed using salt. Alternatively, these materials can be removed, and the new ones can be integrated.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An infrared (IR) sensor for detection of an analyte in a fluid, the IR sensor comprising:
    a housing;
    a reservoir disposed in the housing and configured to contain the fluid;
    a fluid channel in communication with the reservoir;
    a preconcentration material associated with the fluid channel, wherein the preconcentration material enhances IR bands in an IR spectra; and
    a photonic integrated circuit disposed in the housing comprising:
        an IR source configured to transmit IR light towards the fluid channel and the preconcentration material, wherein a spectral characteristic of the IR light is changed by the analyte in the fluid in the fluid channel that is trapped in the preconcentration material; and
        an IR detector configured to receive IR light transmitted through or reflected off the preconcentration material and detect the spectral characteristic.

2. The IR sensor as set forth in claim 1, wherein the fluid channel is disposed on the photonic integrated circuit.

3. The IR sensor as set forth in claim 1, wherein the preconcentration material is coated on the support surface and is selected from the group consisting of:
    an ion exchange resin;
    metal-oxides; and
    metal-organic frameworks (MOFs).

4. The IR sensor as set forth in claim 1, wherein the preconcentration material is disposed proximate the fluid channel and retains at least one selected analyte from the fluid.

5. The IR sensor as set forth in claim 1, wherein the IR source comprises a quantum cascade laser and the IR detector comprises a quantum cascade detector.

6. The IR sensor as set forth in claim 1, wherein the IR source comprises an interband cascade laser (ICL) and the IR detector comprises an interband cascade detector (ICD).

7. The IR sensor as set forth in claim 1, wherein the IR source comprises a light emitting diode.

8. The IR sensor as set forth in claim 7, wherein the IR detector comprises a structure for light emitting diode that operates as a detector at zero or reverse bias.

9. An infrared (IR) sensor for detection of an analyte in a fluid, the IR sensor comprising:
    a housing;
    a reservoir disposed in the housing and configured to contain the fluid;
    a fluid channel in communication with the reservoir;
    a preconcentration material associated with the fluid channel, wherein the preconcentration material enhances IR bands in an IR spectra;
    an IR source configured to transmit IR light towards the fluid channel and the preconcentration material, wherein a spectral characteristic of the IR light is changed by the analyte in the fluid in the fluid channel that is trapped in the preconcentration material; and
    an IR detector configured to receive IR light transmitted through or reflected off the preconcentration material and detect the spectral characteristic.

10. The IR sensor as set forth in claim 9, wherein the preconcentration material is coated on the support surface and is selected from the group consisting of:
    an ion exchange resin;
    metal-oxides; and
    metal-organic frameworks (MOFs).

11. The IR sensor as set forth in claim 9, wherein the preconcentration material is disposed proximate the fluid channel and retains at least one selected analyte from the fluid.

12. The IR sensor as set forth in claim 9, wherein the IR source comprises a quantum cascade laser and the IR detector comprises a quantum cascade detector.

13. The IR sensor as set forth in claim 9, wherein the IR source comprises an interband cascade laser (ICL) and the IR detector comprises an interband cascade detector (ICD).

14. The IR sensor as set forth in claim 9, wherein the IR source comprises a light emitting diode.

15. The IR sensor as set forth in claim 14, wherein the IR detector comprises a structure for light emitting diode that operates as a detector at zero or reverse bias.

16. A method of detecting the presence of an analyte in a fluid, comprising:
- filling a reservoir with the fluid;
- transferring the fluid from the reservoir to a fluid channel in communication with the reservoir, wherein a preconcentration material associated with the fluid channel enhances IR bands in an IR spectra;
- transmitting IR light towards the fluid channel and the preconcentration material, wherein a spectral characteristic of the IR light is changed by the analyte in the fluid in the fluid channel that is trapped in the preconcentration material;
- receiving IR light transmitted through or reflected off the preconcentration material; and
- detecting the spectral characteristic.

17. The method as set forth in claim 16, wherein the preconcentration material in the channel is selected from the group consisting of:
- an ion exchange resin;
- metal-oxides; and
- metal-organic frameworks (MOFs).

18. The method as set forth in claim 16, wherein the preconcentration material is disposed proximate the fluid channel and retains at least one selected analyte from the fluid.

* * * * *